US012544620B2

(12) United States Patent
    Simmonds

(10) Patent No.: US 12,544,620 B2
(45) Date of Patent: Feb. 10, 2026

(54) DEVICES AND COMPUTER TECHNOLOGY CONFIGURED TO ENABLE ENHANCED SIMULATED BICYCLE STEERING, FOR USE WITH A STATIONARY TRAINING SYSTEM

(71) Applicant: Jet Black Products PTY LTD, Queenscliff (AU)

(72) Inventor: Tony Simmonds, Queenscliff (AU)

(73) Assignee: Jet Black Products PTY LTD, Queenscliff (AU)

( * ) Notice: Subject to any disclaimer, the term of this patent is extended or adjusted under 35 U.S.C. 154(b) by 289 days.

(21) Appl. No.: 17/998,068

(22) PCT Filed: Apr. 29, 2021

(86) PCT No.: PCT/AU2021/050387
§ 371 (c)(1),
(2) Date: Nov. 7, 2022

(87) PCT Pub. No.: WO2021/222970
PCT Pub. Date: Nov. 11, 2021

(65) Prior Publication Data
US 2023/0173335 A1    Jun. 8, 2023

(30) Foreign Application Priority Data
May 5, 2020    (AU) ................... 2020901430

(51) Int. Cl.
*A63B 22/06*    (2006.01)
*A63B 24/00*    (2006.01)
(Continued)

(52) U.S. Cl.
CPC ...... *A63B 22/0605* (2013.01); *A63B 24/0062* (2013.01); *A63B 69/16* (2013.01);
(Continued)

(58) Field of Classification Search
CPC . A63B 22/0605; A63B 24/0062; A63B 69/16; A63B 71/0622; A63B 2022/0641;
(Continued)

(56) References Cited

U.S. PATENT DOCUMENTS 5,240,417 A  *  8/1993  Smithson ............... G05B 17/02
                                                    348/121
8,092,352 B2 *  1/2012  Irving ................ A63B 23/0405
                                                     482/57
(Continued)

FOREIGN PATENT DOCUMENTS

CN          102319506 A      1/2012
EP           1214957 A1      6/2002
(Continued)

OTHER PUBLICATIONS

International Search Report for International Application No. PCT/AU2021/050387 dated Jul. 9, 2021, 7 pages.
(Continued)

*Primary Examiner* — Sundhara M Ganesan
(74) *Attorney, Agent, or Firm* — TraskBritt

(57) ABSTRACT

Devices and computer technology are configured to enable enhanced simulated bicycle steering for use with a stationary training system. For example, one embodiment includes a device configured to support and enable simulated steering of a bicycle front wheel, for use with a stationary training system, optionally including a sensor device configured to provide a steering signal for user by a bicycle simulator software application. Further embodiments include computer technology configured to provide bicycle simulation functionality, including steering. Simulation of steering is in some embodiments based on a combination of handlebars turning and bicycle tilt, and may account for countersteering motions.

5 Claims, 6 Drawing Sheets

(51) Int. Cl.
*A63B 69/16* (2006.01)
*A63B 71/06* (2006.01)

(52) U.S. Cl.
CPC .. *A63B 71/0622* (2013.01); *A63B 2022/0641* (2013.01); *A63B 2024/0093* (2013.01); *A63B 2069/163* (2013.01); *A63B 2069/165* (2013.01); *A63B 2071/0638* (2013.01); *A63B 2220/30* (2013.01); *A63B 2220/803* (2013.01); *A63B 2220/833* (2013.01); *A63B 2220/836* (2013.01); *A63B 2225/20* (2013.01); *A63B 2225/50* (2013.01); *A63B 2230/062* (2013.01)

(58) Field of Classification Search
CPC ...... A63B 2024/0093; A63B 2069/163; A63B 2069/165; A63B 2071/0638; A63B 2220/30; A63B 2220/803; A63B 2220/833; A63B 2220/836; A63B 2225/20; A63B 2225/50; A63B 2230/062; A63B 2220/44; A63B 2230/06; A63B 2220/24; A63B 2220/31; A63B 2024/0096; G09B 9/058
See application file for complete search history.

(56) References Cited

U.S. PATENT DOCUMENTS

| | | | | |
|---|---|---|---|---|
| 8,951,168 | B2* | 2/2015 | Baudhuin | G16H 40/20 482/8 |
| 11,260,280 | B2* | 3/2022 | Papadopoulos | A63B 69/16 |
| 2002/0055422 | A1* | 5/2002 | Airmet | A63B 22/16 482/61 |
| 2005/0008992 | A1* | 1/2005 | Westergaard | A63B 24/00 434/61 |
| 2005/0109064 | A1* | 5/2005 | Takei | C03B 37/01486 65/382 |
| 2005/0187641 | A1* | 8/2005 | Robbins | G05B 17/02 700/1 |
| 2009/0292178 | A1* | 11/2009 | Ellis | G16H 10/60 600/301 |
| 2011/0172059 | A1* | 7/2011 | Watterson | A63B 24/0062 482/5 |
| 2012/0071301 | A1* | 3/2012 | Kaylor | A63B 21/00058 482/57 |
| 2012/0238412 | A1* | 9/2012 | Hamilton | A63B 24/0087 482/61 |
| 2014/0171266 | A1* | 6/2014 | Hawkins, III | A63B 21/225 482/5 |
| 2014/0171272 | A1* | 6/2014 | Hawkins, III | A63B 24/0087 482/61 |
| 2015/0290490 | A1* | 10/2015 | Badarneh | A63B 21/00192 482/57 |
| 2016/0325146 | A1* | 11/2016 | Shin | H04L 67/306 |
| 2017/0072254 | A1* | 3/2017 | Ryu | A63G 31/16 |
| 2017/0340921 | A1* | 11/2017 | Fischer | A63B 71/0697 |
| 2018/0078818 | A1* | 3/2018 | Chao | A63B 24/00 |
| 2020/0215381 | A1* | 7/2020 | Bass | A63B 22/16 |
| 2020/0406090 | A1* | 12/2020 | Seidler | A63B 21/4035 |
| 2022/0054885 | A1* | 2/2022 | van der Kroft | A63B 22/0605 |

FOREIGN PATENT DOCUMENTS

| | | |
|---|---|---|
| WO | 91/09374 | 6/1991 |
| WO | 92/16267 | 10/1992 |
| WO | 96/36399 A1 | 11/1996 |
| WO | 2007/024239 A1 | 3/2007 |
| WO | 2019/035990 A1 | 2/2019 |
| WO | 2020/018930 A1 | 1/2020 |

OTHER PUBLICATIONS

International Written Opinion for International Application No. PCT/AU2021/050387 dated Jul. 9, 2021, 13 pages.

* cited by examiner

DEVICES AND COMPUTER TECHNOLOGY CONFIGURED TO ENABLE ENHANCED SIMULATED BICYCLE STEERING, FOR USE WITH A STATIONARY TRAINING SYSTEM

CROSS-REFERENCE TO RELATED APPLICATIONS

This application is a national phase entry under 35 U.S.C. § 371 of International Patent Application PCT/AU2021/050387, filed Apr. 29, 2021, designating the United States of America and published as International Patent Publication WO 2021/222970 A1 on Nov. 11, 2021, which claims the benefit under Article 8 of the Patent Cooperation Treaty to Australian Patent Application Serial No. 2020901430, filed May 5, 2020.

TECHNICAL FIELD

The present disclosure relates, in various embodiments, to devices and computer technology configured to enable enhanced simulated bicycle steering, for use with a stationary training system. For example, one embodiment includes a device configured to support and enable simulated steering of a bicycle front wheel, for use with a stationary training system, optionally including a sensor device configured to provide a steering signal for user by a bicycle simulator software application. Further embodiments include computer technology configured to provide bicycle simulation functionality, including steering. Simulation of steering is, in some embodiments, based on a combination of handlebars turning and bicycle tilt, and may account for counter steering motions.

BACKGROUND

Any discussion of the background art throughout the specification should in no way be considered as an admission that such art is widely known or forms part of common general knowledge in the field.

Various common configurations of bicycle trainer assemblies include a device that supports the rear of a bicycle. For example, this may include a trainer unit that connects to a rear axle region of the bicycle frame in place of a rear wheel, or a trainer unit into which a conventionally affixed rear wheel of the bicycle is mounted. In either case, a basic premise of the system is that the bicycle is supported in a substantially stable position in which a rider is able to pedal the bicycle in a stationary position with resistance being provided via the trainer assemblies. In conventional arrangements, the bicycle's front wheel is positioned on the ground, and serves no functional purpose to the trainer assemblies.

In recent times, it has become popular to combine bicycle trainer assemblies with software applications that provide a graphical simulation of riding, in response to input from a bicycle trainer assemblies. For example, these are programmed such that a graphical user interface displays a representation of simulated bicycling at a variable velocity, with the variable velocity being controlled based on input from digital data collected by the trainer assembly.

It is an object of the present disclosure to overcome or ameliorate at least one of the disadvantages of the prior art, or to provide a useful alternative.

BRIEF SUMMARY

Example embodiments are described below in the section titled "claims," and in the section titled "detailed description."

One embodiment provides a system for providing simulation of bicycle activity, the system including: a velocity input configured to receive a signal representative of user interaction with a bicycle drivetrain mechanism; a steering input configured to receive a signal representative of user interaction with a bicycle handlebar turn mechanism; a tilting input configured to receive a signal representative of user interaction with a bicycle tilt mechanism; an input processing unit configured to process the signals received from the velocity input, the steering input and the tilting input, thereby enabling delivery of a visual simulation of bicycle riding via a display screen, wherein the visual simulation includes simulated steering based on a combination of at least: (i) the signal representative of user interaction with the bicycle handlebar turn mechanism; and (ii) the signal representative of user interaction with the bicycle tilt mechanism.

One embodiment provides a front wheel support unit for a bicycle training system, wherein the bicycle training system includes a resistance trainer unit configured to support a rear region of a bicycle and enable a user to pedal the bicycle in stationary configuration, wherein the front wheel support unit includes: a disc-shaped body having a base component configured to be placed on flat ground, and a top component coaxially mounted to the base component and supported on a central pivot assembly, such that the central pivot assembly enables relative rotation of the top component relative to the bottom component about a vertical axis; a wheel supporting channel provided on an upper face of the top component, wherein the wheel supporting channel is curved about two axis, thereby receiving the front wheel in a manner that inhibits fore/aft movement of the front wheel and lateral movement of the front wheel, with the wheel resting substantially stably in a resting location; wherein the wheel supporting channel is provided on the upper face of the top component such that the resting location positions the wheel in a configuration in which the center of the wheel is rearwardly offset from the pivot point; and wherein the rearward offset is configured such that a region defining a junction between the central pivot assembly and the top component is located approximately on a line defined coaxially with a steerer tube of a bicycle having defined standardized geometry; the support until further including a sensor device configured to measure rotation of the top component relative to the base component, thereby enabling derivation of data representative of wheel orientation relative to a defined straight-ahead orientation.

One embodiment provides a bicycle trainer assembly configured to collect performance data from one or more of: a velocity input configured to receive a signal representative of user interaction with a bicycle drivetrain mechanism; a steering input configured to receive a signal representative of user interaction with a bicycle handlebar turn mechanism; and a tilting input configured to receive a signal representative of user interaction with a bicycle tilt mechanism; wherein the bicycle trainer assembly is additionally configured to collect physiological data from a wearable physiological sensor; and wherein the bicycle trainer assembly is additionally configured to communicate data derived from the performance data and the physiological data to an external device that executes software thereby providing a bicycle riding simulator program that includes a graphical simulator interface that is rendered on a display screen.

One embodiment provides a system for providing simulation of bicycle activity, the system including: a velocity input configured to receive a signal representative of user interaction with a bicycle drivetrain mechanism; a tilting input configured to receive a signal representative of user interaction with a bicycle tilt mechanism; an input processing unit configured to process the signals received from the velocity input, the steering input and the tilting input, thereby delivering a visual simulation of bicycle riding via a display screen, wherein the visual simulation includes simulated steering based on a combination of at least: the signal representative of user interaction with the bicycle tilt mechanism.

One embodiment provides a method for providing simulation of bicycle activity, the method including processing data derived from sensors coupled to a bicycle trainer arrangement, thereby enabling delivery of a visual simulation of bicycle riding via a display screen, wherein the visual simulation includes simulated steering based on a combination of at least: (i) a signal representative of user interaction with a bicycle handlebar turn mechanism; and (ii) a signal representative of user interaction with a bicycle tilt mechanism.

One embodiment provides a bicycle training system including: (i) a mount for a rear component of a bicycle, configured to hold the bicycle in a stationary position; (ii) a mount for a front component of the bicycle, wherein the mount for a front component of the bicycle allows for turning of handlebars while the bicycle is in the stationary position; and (iii) a tilt assembly, which enables limited side-to-side tilting of the bicycle when in the stationary position; such that the system provides a natural simulated feel of combined steering and tilting.

Reference throughout this specification to "one embodiment," "some embodiments" or "an embodiment" means that a particular feature, structure or characteristic described in connection with the embodiment is included in at least one embodiment of the present disclosure. Thus, appearances of the phrases "in one embodiment," "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms "comprising," "comprised of" or "that comprises" is an open term that means including at least the elements/features that follow, but not excluding others. Thus, the term "comprising," when used in the claims, should not be interpreted as being limitative to the means or elements or steps listed thereafter. For example, the scope of the expression "a device comprising A and B" should not be limited to devices consisting only of elements A and B. Any one of the terms "including" or "which includes" or "that includes" as used herein is also an open term that also means including at least the elements/features that follow the term, but not excluding others. Thus, "including" is synonymous with and means "comprising."

As used herein, the term "exemplary" is used in the sense of providing examples, as opposed to indicating quality. That is, an "exemplary embodiment" is an embodiment provided as an example, as opposed to necessarily being an embodiment of exemplary quality.

BRIEF DESCRIPTION OF THE DRAWINGS

Embodiments of the disclosure will now be described, by way of example only, with reference to the accompanying drawings in which.

DETAILED DESCRIPTION

The present disclosure relates, in various embodiments, to devices and computer technology configured to enable enhanced simulated bicycle steering, for use with a stationary training system. For example, one embodiment includes a device configured to support and enable simulated steering of a bicycle front wheel, for use with a stationary training system, optionally including a sensor device configured to provide a steering signal for user by a bicycle simulator software application. Further embodiments include computer technology configured to provide bicycle simulation functionality, including steering. Simulation of steering is, in some embodiments, based on a combination of handlebars turning and bicycle tilt, and may account for counter steering motions.

Various embodiments described below are applicable in the context of several categories of bicycle trainer assembly. These include:

Trainers that are configured to receive a complete bicycle, and engage with a rear wheel of that bicycle, thereby offering resistance. These are often referred to as "wheel-on" trainers.

Trainers that are configured to receive a partially deconstructed bicycle, deconstructed in the sense that the rear wheel is removed, and engage with a drivetrain of that bicycle, thereby offering resistance. These are often referred to as "wheel-off" trainers. In these examples, the existing bicycle drivetrain typically attaches to a cassette that is mounted to the trainer assembly.

Integrated trainers. These are trainer assemblies that have an integrated bicycle drivetrain, saddle and cockpit, often referred to as "stationary bicycles." These differ from the previous examples in the sense that, in the previous examples, a conventional bicycle is mounted to a trainer, and in this example, the trainer does not require a separate bicycle to be mounted.

It will be appreciated that various aspects of technology described herein are, while described in relation to only one category of trainer, are applicable to multiple categories of trainer. For example, technology related to simulated steering based on a combination of steering input and tilt input are applicable to all three categories of trainer.

Figure 1:
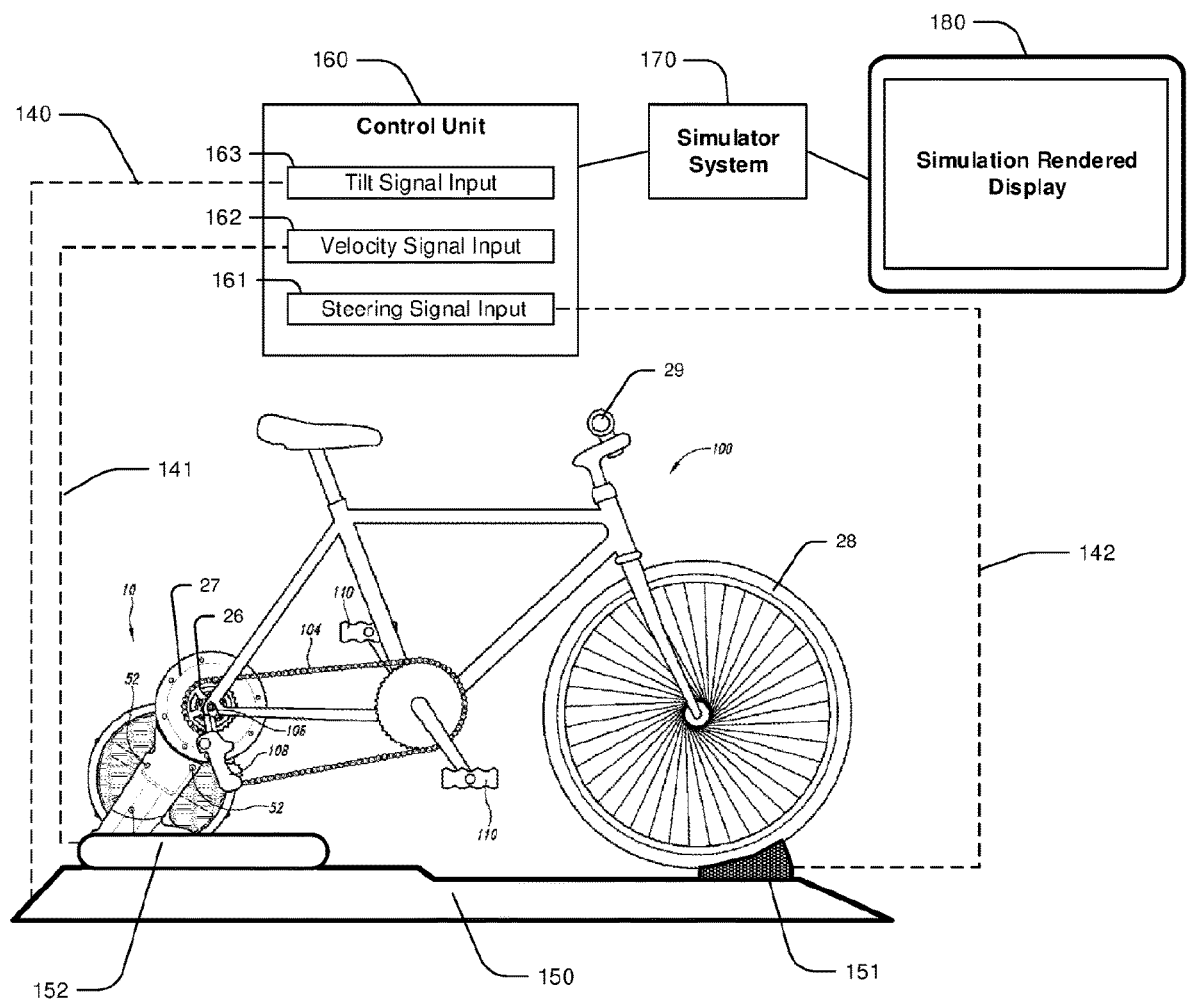
FIG. 1 illustrates a framework configured to provide a simulation of bicycle riding via a graphical user interface.
Figure 2A:
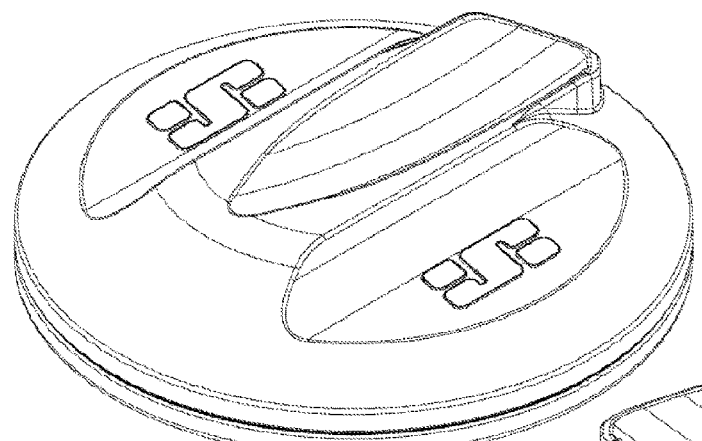
FIG. 2A and FIG. 2B provide perspective views of a front wheel support unit according to one embodiment.
Figure 2B:
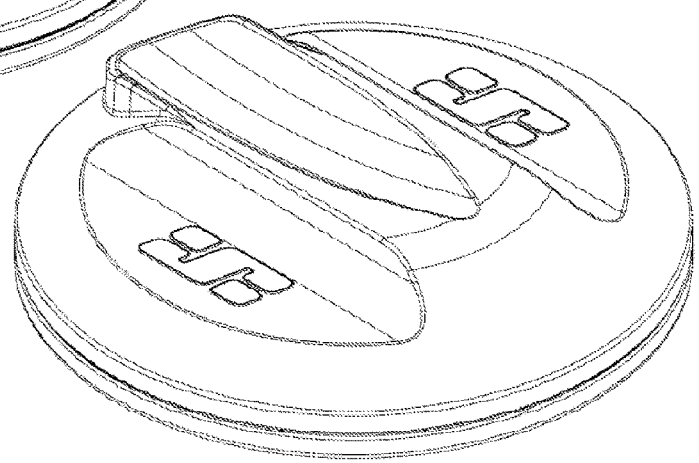
Figure 3:
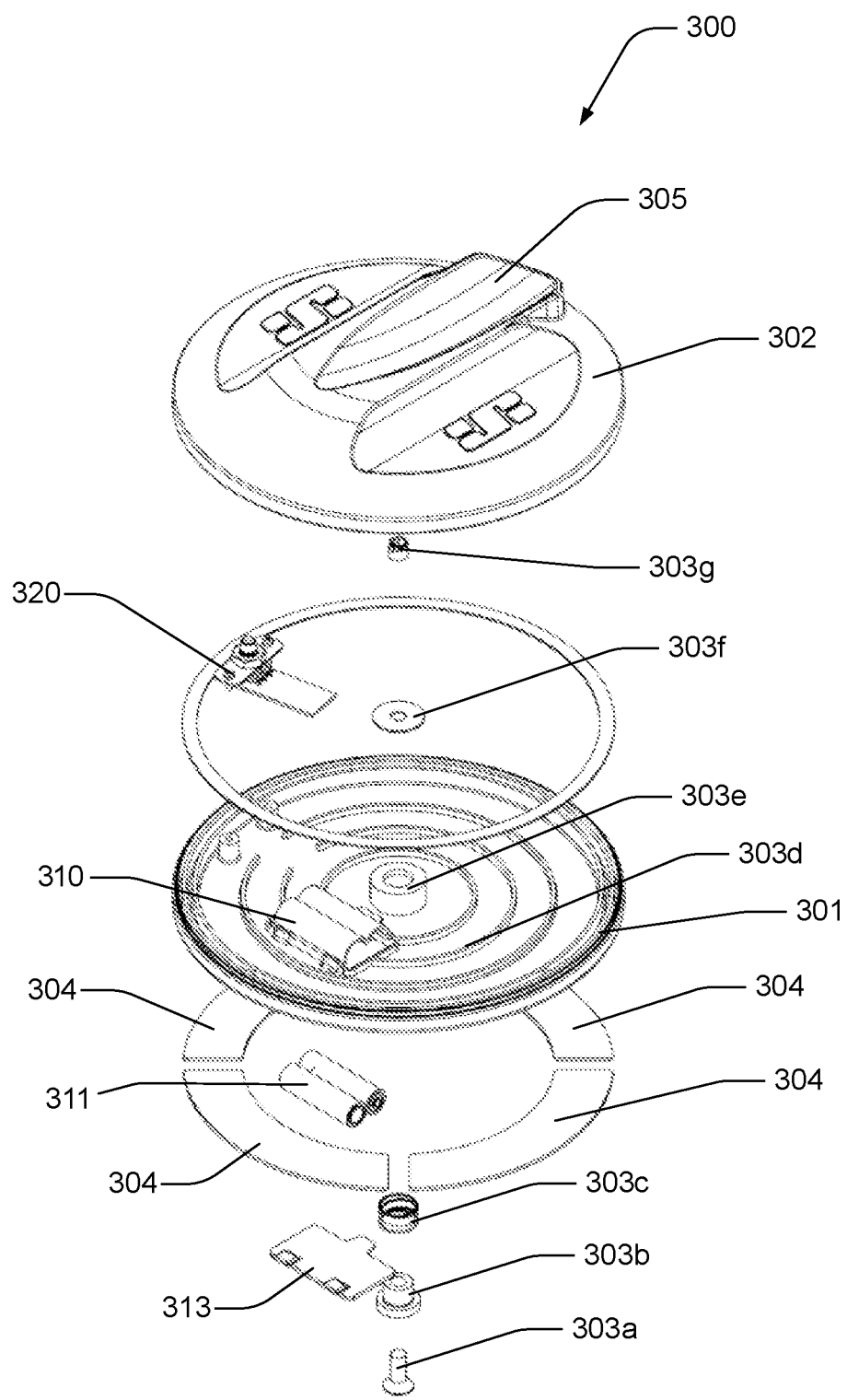
FIG. 3 provides an exploded view of the unit of FIG. 2A.
Figure 4A:
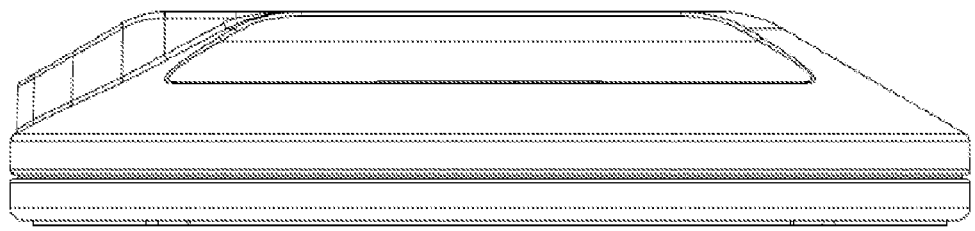
FIG. 4A provides a side view of the unit.
Figure 4B:
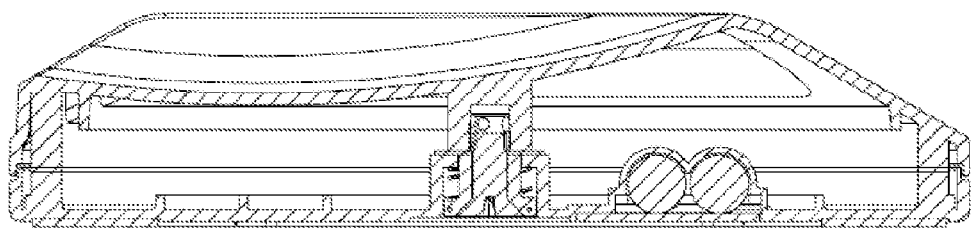
FIG. 4B provides a cross sectional view of the unit corresponding to FIG. 4A.

FIG. 1 illustrates an example arrangement according to one embodiment, this example making use of a "wheel-off" assembly of trainer 10. Trainer 10 includes an arm 52 that extends from a base member 152. Arm 52 supports a freewheel assembly 27, which is coupled to trainer internals that are configured to provide resistance, monitor rotational velocity, and other functions. The assembly of trainer 10 may be operated by a user for stationary riding when coupled to a conventional bicycle 100 (shown in FIG. 1). To use the bike trainer 10, a user first removes the rear wheel of the bicycle 100, secures the rear dropouts 106 of the bicycle to the bike trainer 10, tightens the axle clamp adjustment, and aligns a chain 104 of the bicycle with one of the sprockets of the cassette 26. In operation, the cassette 26 works with a rear derailleur 108 of the bicycle 100 to provide multiple gear ratios for a user of the bike trainer 10. The cassette is mounted to a freewheel assembly 27 of the trainer. In this regard, trainer 10 operates substantially as any of a wide range of known wheel-off trainers. In a further embodiment, arm 52 and freewheel assembly 27 are replaced with a wheel-on trainer functional assembly.

Regardless of the style of trainer used, a component of trainer 10 provides an output, which may be wired or wireless (for example, WiFi or Bluetooth) that provides what is referred to herein as a "velocity signal" that represents a simulated velocity based on data observations. The velocity signal is representative of the rate at which bicycle 100 would be moving, if it were not attached to trainer 10 (which is wholly or primarily effected by pedaling of bicycle 100 using pedals 110). This is optionally calculated by measuring a velocity RPM of a component of trainer 10, and extrapolating that to a bicycle wheel size (or, in the case of a wheel-on trainer, based on the linear velocity of the bicycle wheel/tire periphery). The velocity signal is, in some embodiments, additionally representative of other effects of user interaction the drivetrain of bicycle 100 (via pedaling using pedals 110), for instance, optionally including cadence. In some embodiments, the simulated velocity is derived from measurements of power.

The velocity signal is optionally calculated by measuring a velocity RPM of a component of trainer 10, and extrapolating that to a bicycle wheel size (or, in the case of a wheel-on trainer, based on the linear velocity of the bicycle wheel/tire periphery). The velocity signal is, in some embodiments, additionally representative of other effects of user interaction with the drivetrain of bicycle 100 (via pedaling using pedals 110), for instance, optionally including cadence.

Velocity signal 141 is transmitted via a wired or wireless coupling to a velocity signal input 162 of a control unit 160. Control unit 160 then passes on the velocity signal, or a signal derived therefrom, to a simulator system 170. In some embodiments, control unit 160 is physically housed inside trainer 10.

Simulator system 170 includes a microprocessor configured to execute computer code (software instructions), which are stored on a memory module of simulator system 170. These software instructions include software instructions configured to provide a bicycle simulator program, which delivers a rendering of a simulation interface on a display screen 180. This simulation preferably includes a representation of vehicular travel (typically bicycle travel), with a velocity of travel being controlled based on the velocity signal. For example, the simulation interface provides a rendered display of simulated bicycle riding at a simulated velocity corresponding to a measured theoretical velocity determined from the velocity signal. It should be appreciated that, although the input device for the simulator in the present embodiments is a bicycle or bicycle-like device, there simulator need not show simulated bicycling (for example, in one embodiment, a user interacts with the bicycle inputs to control an airplane in the virtual environment).

In the illustrated embodiment, a front wheel 28 of bicycle 100 is mounted to a front wheel support unit 151. Front wheel support unit 151 includes a top part configured to pivot about a vertical axis, thereby enabling turning of handlebars 29 is bicycle 100, and in doing so simulate steering. A specific example of a suitable wheel support unit is described further below. Front wheel support unit 151 includes a sensor configured to measure pivoting, and, hence, provide a signal representative of bicycle steering activity, referred to as a steering signal 142. This is transmitted via wired or wireless communication to a steering signal input 161 of control unit 160.

In further embodiments, steering signal 142 is derived by other means. These may include:

- A sensor configured to directly measure rotation of a steerer tube relative to the frame (particularly relevant in the case of integrated trainers, where there is no front wheel).
- An accelerometer mounted to the handlebars or a component that rotates with the handlebars (for example, forks, stem, hub, or the like). In some embodiments, this is provided via a smartphone that is mounted to the handlebars or stem.

As noted, steering signal 142 is transmitted via a wired or wireless coupling to a steering signal input 161 of control unit 160. Control unit 160 then passes on the steering signal, or a signal derived therefrom, to simulator system 170. Simulator system 170 is configured to, based on the steering signal, simulate bicycle steering. For instance, in a simple example, an angle of handlebar 29 steering on bicycle 100 is converted to a degree of simulated bicycle steering/turning in the simulated virtual environment.

In some embodiments, steering simulation via simulator system 170 is controlled via steering signal 142 in isolation. However, in other embodiments, as described below, steering simulation via simulator system 170 is controlled by way of a combination of monitoring steering and bicycle tilt. This combination provides a more realistic simulation, as in practice steering via handlebars is only part of the overall process of steering a bicycle, with tilt being of equal or greater importance.

Tilt is facilitated by way of a tilting plate, also referred to as a rocker plate. Combining tilt and steering into a trainer arrangement provides a much more natural feel to a user, and optionally as discussed herein can allow for an improved simulator system.

An example rocker plate 150 is illustrated. Various forms of rocker plate are commercially available (for example, currently sold by brands KON Cycling and LifeLine). These rocker plates typically include an upper plate member, to which trainer 10, and optionally front wheel support unit 151, is enabled to be mounted. In some embodiments, either or both of trainer 10 and front wheel support unit 151 are integrally formed with the upper plate member. The upper plate member is coupled to a lower plate member, such that the upper plate member is able to tilt about a horizontal axis that is parallel and aligned with the central plane of the bicycle, typically by between 10 and 20 degrees in each direction. This allows a bicycle, when mounted, to tilt from side-to-side. A bias mechanism is provided, thereby providing a bias force between the upper and lower plate mechanisms. In some embodiments, the bias mechanism is provided by one or more pairs of resident balls (for example, inflated rubber balls, tennis-style balls, or the like) that are sandwiched between the upper and lower plates, and disposed evenly to each side of the vertical plane defined by the bicycle. However, other arrangements may also be used.

In some embodiments, a control system is integrated into the rocker plate, thereby providing feedback, which may be used to inhibit tilting in a controlled manner (for example, in response to processing of the velocity signal, thereby providing feedback representative of centripetal force). This may include a system that selectively increases/decreases pressure in a ball or other bladder, which provides a resilient resistance to tilting of the upper plate relative to the lower plate (a rubberized solution, spring and/or valve may alternately be used to achieve a corresponding result). Such a control system adds significantly to the cost of the overall trainer assembly, but can be used to provide a force feedback mechanism by which simulator logic is able to move the bicycle, adding to a realistic feel. In some embodiments, force feedback, for example, via a servomotor, is integrated into front when front wheel support unit 151.

Regardless of the style of rocker plate used, a sensor is configured to generate a signal referred to herein as a "tilt signal" 140. The tilt signal 140 is representative of tilt of bicycle 100 relative to a vertical plane. There are various forms of sensor hardware that may be used to generate tilt signal 140, including:

A digital level sensor mounted to any of: the upper plate of rocker plate 150, front wheel support unit 151, trainer 10, or a component of bicycle 100.

An IMU, gyroscope, or other such component mounted to any of: the upper plate of rocker plate 150, front wheel support unit 151, or trainer 10. For example, this may be an IMU mounted in front wheel support unit 151 configured to determine both steering and tilt, allowing a conventional "dumb" rocker plate to be used.

A smartphone having an IMU mounted to the stem of bicycle 100. This may optionally measure both tilt and steering.

Pressure sensors configured to monitor pressure in bladders (e.g., inflated balls) are provided by the rocker plate on either side of the bicycle plane, such that pressure changes depending on bicycle tilt (pressure increases in a right-side bladder progressively as the bicycle is tilted further to the right). A load cell or strain gauge may be used.

Strain gauges provided by the rocker plate on either side of the bicycle plane.

Tilt signal 140 is transmitted via a wired or wireless coupling to a velocity signal input 162 of a control unit 160. Control unit 160 then passes on the tilt signal, or a signal derived therefrom, to a simulator system 170.

In some embodiments, control unit 160 processes the steering signal and the tilt signal, thereby providing a single combined steering signal to simulator system 170, this combines signal being in the form of a steering or turning input in a format required by the simulator system (for example, representative of an angle of turn or the like). In other embodiments, this combining of steering and tilt is performed in the simulator system.

Accordingly, simulator system 170 provides a system for providing simulation of bicycle activity, the system including:

(i) A velocity input is configured to receive a signal representative of user interaction with a bicycle drivetrain mechanism. For example, this is in some cases a signal derived directly or indirectly from a sensor component of trainer 10. This may include a signal that is received by velocity signal input 162, and processed into a form compatible with simulator system 170.

(ii) A steering input is configured to receive a signal representative of user interaction with a bicycle handlebar turn mechanism. For example, this is, in some cases, a signal derived directly or indirectly from a sensor component of which provides steering signal 142, for example, a sensor in front wheel support unit 151. The steering input may include a signal that is received by steering signal input 161, and processed into a form compatible with simulator system 170.

(iii) A tilting input is configured to receive a signal representative of user interaction with a bicycle tilt mechanism. For example, this is in some cases a signal derived directly or indirectly from a sensor component of rocker plate 150, or sensor mounted to front wheel support unit 151 or bicycle 100. This may include a tilt signal 140 that is received by tilt signal input 163, and processed into a form compatible with simulator system 170.

In some embodiments, the steering and tilting input are combined into a single turning metric by control unit 160, and that single turn metric is provided to simulator system 170 to enable control over turning in the simulation. In such cases, simulator system 170 still provides a steering input and a turning input; these are however combined into a single input that receives a signal derived from both steering and turning signals.

In the illustrated embodiment, control unit 160 and simulator system 170 are in combination configured to process the signals received from the velocity input, the steering input and the tilting input, thereby delivering a visual simulation of bicycle riding via a display screen, wherein the visual simulation includes simulated steering based on a combination of at least:

(i) the signal representative of user interaction with the bicycle handlebar turn mechanism; and
(ii) the signal representative of user interaction with the bicycle tilt mechanism.

The processing is configured such that the simulation is configured to recognize counter steering. The term "counter steering" refers to a technique in bicycle riding in which handlebars are turned in an opposite direction to a direction in which the bicycle is steered. In overview, counter steering operates as follows:

A torque on the handlebars to the right is applied.
The front wheel will then rotate about the steering axis to the right and the tire will generate forces in the contact patch to the right.
The bicycle as a whole steers to the right.
Because the forces in the contact patch are at ground level, this pulls the wheels "out from under" the bike to the right and causes it to lean to the left.
The rider, or in most cases the inherent stability of the bike, provides the steering torque necessary to rotate the front wheel back to the left and in the direction of the desired turn.
The bike begins a turn to the left.

A simulation that is configured to recognize counter steering will not always associate a turn on the handlebars to the left with a simulated turn to the left (or a turn of the handlebars to the right with a simulated turn to the right). At least in at least some instances, the simulation is configured to simulate a left turn in response in response to the signal representative of user interaction with a bicycle handlebar turn mechanism turning to the right.

It will be appreciated that there are various approaches for configuring a software program to process steering and tilting signals, thereby providing a simulation that accounts for counter steering. These include:

Conventional programming techniques, whereby to simulator is programmed manually by experienced programmers, tested, and refined.

An AI approach, whereby data is collected from bicycles being ridden in real-life situations, and processed, thereby training an algorithm to convert signals representative of any combination of steering angle, tilt angle and velocity into a steering simulation signal.

In relation to the latter, an example approach is to affix sensor arrays to a plurality of bicycles, thereby populating a training database. The training database may include bicycle state parameter data, which is representative of one or more of the following: steering angle; rate of change in steering angle; tilt angle; rate of change in tilt angle; bicycle velocity/speed, and rate of change in bicycle velocity/speed. These may be for a point-in-time sample, or averaged over a period (for example, a 1-second period). These values may be derived from accelerometers/IMUS, and/or other sensors (including speed sensors). The sample data is labelled with a turn metric configured to be used by a simulator program (for example, a rate of change of bicycle turn). This is used to train an AI system learn relationship between a set of bicycle state parameter data, and a turn metric. Once trained, the AI system is enabled to receive input of a new set of bicycle state parameter data, and provide an output in the form of an associated turn metric, which is able to be used for the purposes of controlling a bicycle simulation.

It will be appreciated that a wide range of AI/machine learning technologies may be used for this purpose, and a person skilled in the relevant field will readily recognize appropriate technologies and techniques for training an AI system accordingly.

It will be appreciated that the technology described herein thereby provides a method, for example, a computer-implemented method performed by execution of computer-readable code carried on a physical medium, for providing simulation of bicycle activity, the method including processing data derived from sensors coupled to a bicycle trainer arrangement, thereby enabling delivery of a visual simulation of bicycle riding via a display screen. This, the visual simulation, includes simulated steering, which takes into account counter steering. This is preferably based (directly or indirectly) on a combination of at least: (i) a signal representative of user interaction with a bicycle handlebar turn mechanism; and (ii) a signal representative of user interaction with a bicycle tilt mechanism. This is, in some cases, combined with signal representative of bicycle velocity (being a theoretical velocity for a bicycle that is stationary, but with a rear wheel/axle in motion).

In some embodiments, control unit 160 provides a data collection and transmission hub for a simulator system such as simulator system 170. Often, hardware associated with simulator system 170 is limited in terms of a number of wireless devices that can be connected (for example, when the simulator system uses, for example, AppleTV hardware with simulator software executing as a software application thereon). In such cases, control unit 160 is used to receive multiple wireless signals from multiple wireless devices, and provide them as a single wireless signal to the simulator system. This preferably includes one or more wireless signals from bicycle monitoring sensors (for example, velocity, steering angle, tilt, cadence, etc.) and at least one device that collects physiological data from a wearable physiological sensor (for example, a heart rate monitor). The control unit may in this regard be embedded in trainer 10.

Some embodiments relate to a device configured to support and enable simulated steering of a bicycle front wheel for use with a stationary training system. For the present embodiments, the term "bicycle training system" refers to any system that allows a conventional bicycle to be used for the purposes of stationary ride simulation. This may include: (i) trainers that include a rear-wheel mounting arrangement that secures a rear wheel and provides resistance to that wheel ("wheel-on" trainers); (ii) trainers that are configured to replace a rear wheel and provide resistance more directly ("wheel-off" trainers); and (iii) other forms of trainers.

An example front wheel support unit for a bicycle training system is discussed herein. Such a unit is used to hold the front wheel in place during stationary bicycle utilization. Embodiments described herein provide front wheel support units that are configured to rotate, thereby enabling simulation of bicycle steering. Embodiments include: "smart" units, which include electronic componentry configured to enable measurement of steering, thereby providing digital feedback to a simulation software application; "dumb" units that do not include such componentry; and "adaptable" units that are able to function as "dumb" units and have componentry subsequently inserted, thereby converting them into "smart" units. It will be appreciated that "smart" units are useful in the context of simulation settings, for example, as described further above.

An example embodiment is described by reference to FIG. 2A to FIG. 6. It will be appreciated that this example embodiment includes a range of design preferments that are not present in all embodiments, including aspects of shape and ornamentation.

In the example embodiment provided in the figures, a front wheel support unit 300 is configured to be used with a bicycle training system. For example, this may be a bicycle training system that includes a resistance trainer unit that is configured to support a rear region of a bicycle and enable a user to pedal the bicycle in stationary configuration. Front wheel support unit 300 includes a disc-shaped body. This body is formed from components including a base component 301, which is configured to be placed on flat ground (optionally with friction grip members 304), and a top component 302, which is coaxially mounted to the base component and supported on a central pivot assembly. The central pivot assembly enables relative rotation of the top component relative to the bottom component about a vertical axis. In this example, the central pivot assembly is formed via components 303a-303g, which collectively provide a central pivot about which the base and top rotate. This rotation may be further facilitated by formations in the base and/or top, which can be defined to improve gliding and/or structural rigidity. Various modifications may be made to the central pivot, including utilization of bearings and the like.

A wheel supporting channel 305 is provided on an upper face of the top component 302. In the illustrated embodiment, these are integrally formed as a single piece (for example, via an injection molding process). The wheel supporting channel is curved about two axis, thereby receiving the front wheel in a manner that inhibits fore/aft movement of the front wheel and lateral movement of the front wheel, with the wheel resting substantially stably in a resting location. In the fore/aft direction, the extent of curvature is asymmetrical, thereby rendering it easier for the wheel to enter the channel from the aft direction (from the left-hand-side in the orientation shown in FIG. 3, which clearly shows this asymmetry).

Figure 5:
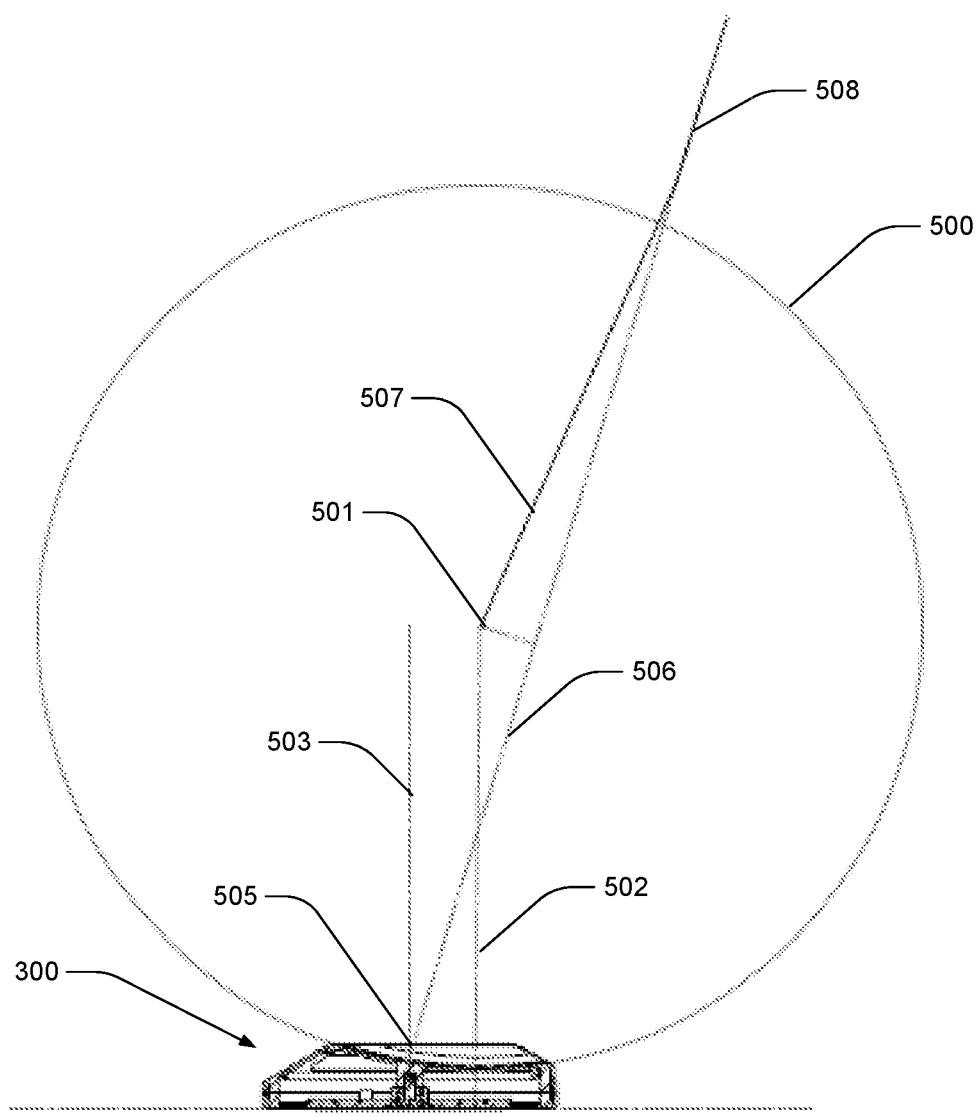
FIG. 5 shows the unit in the same view as FIG. 4B, shown relative to steering geometry.
Figure 6:
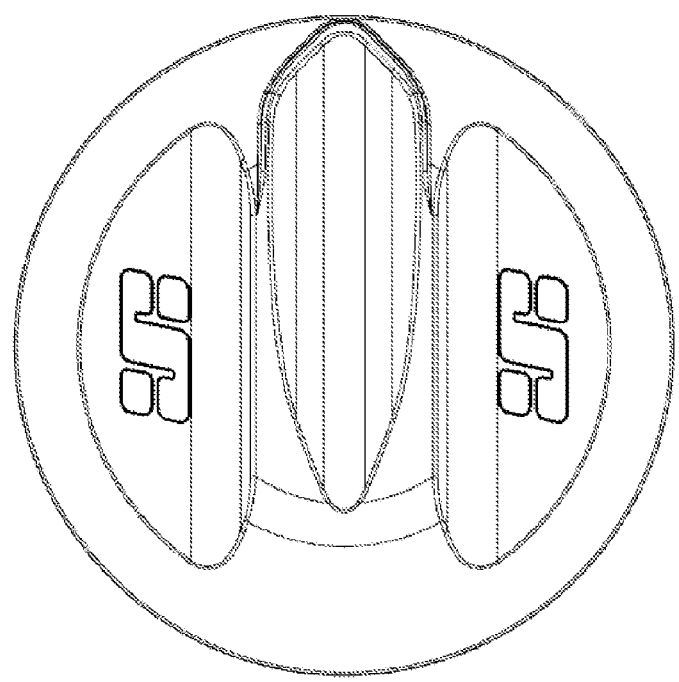
FIG. 6 provides a top view of the unit.

The wheel supporting channel is provided on the upper face of the top component such, when in the resting location, the wheel is positioned in a configuration whereby the center of the wheel (measured vertically from the center of the hub axle) is rearwardly offset from the pivot point of the central pivot assembly. This is best shown in FIG. 5, which shows an example wheel circumference 500 in the resting location as supported by front wheel support unit 300. Center point 501 shows the center of the wheel, and line 502 draws vertically to front wheel support unit 300. The axis of the central pivot assembly is shown by line 503.

The rearward offset is configured such that a region defining a junction between the central pivot assembly and the top component (see region 505 in FIG. 5) is located approximately on a line 506 defined coaxially with a steerer tube of a bicycle having defined standardized geometry. This provides an especially natural steering feel, which is of practical technical performance in the context of steering simulation on a stationary bicycle.

The term "standardized geometry" is used to describe a standardized set of assumed bicycle geometry that is used when designing front wheel support unit 300. As context steerer tube angles (also referred to a head tube angles) range from about 63 degrees (slack gravity-oriented mountain bikes) to about 74 degrees (razor-sharp road bikes). In some embodiments, the standardized geometry used for the purposes herein may include a 70 degree steerer tube angle for a road bike model, and a 67 degree steerer tube angle for a mountain bike model. There is also a factor of fork offset, which defines a deviation between center point 501 and line 506, as a fork is raked/curved/bent to provide an offset (see line 507). A standardized geometry measurement is also used for the purposes of accounting for offset when defining precise measurements to which front wheel support unit 300 is constructed. For both steerer tube angle and fork offset, the objective is to select manufacturing values that present an average, thereby ideally maintaining line 506 relatively close to the actual steerer tube axis across a range of actual bicycles. The angles shown in FIG. 5 are used in certain preferred embodiments.

Front wheel support unit 300 includes a power supply casing 310 formed in base component 301 that, in this embodiment, is configured to receive a pair of batteries 311, which are held securely in place via a cover 313. These batteries are required only in the case that front wheel support unit 300 is to be operated in a "smart" configuration. In the "smart" configuration, electrical components 320 are mounted to base component 301. These components include a sensor device, a microprocessor, and a wireless data transmission module.

In some embodiments, the sensor device includes a contact sensor, which is mounted in a position fixed with respect to one of the top component or base component, and is configured to contact with and sense movement of the other of the base component or top component. In some embodiments, the sensor device includes an optical sensor that is mounted in a position fixed with respect to one of the top component or base component, and is configured to sense movement of the other of the base component or top component. In some embodiments, the sensor device includes a magnetic sensor.

In some embodiments, the sensor device includes an accelerometer (for example, an IMU), which is mounted to the top component 302, and is configured to measure accelerations, thereby inferring steering.

It will be appreciated that front wheel support unit 300 may also include one or more sensors configured to measure tilt, for the purposes to providing a tilt signal 140 as described above. This may include an accelerometer/IMU/gyroscope mounted to front wheel support unit 300. This may be an IMU mounted to the top component 302 to additionally measure steering, however it will be appreciated that there is a balance between processing complexity associated with measuring steering and tilt simultaneously, against higher cost of providing a secondary sensor on the bottom component, thereby measuring tilt independent of steering.

The wireless data transmission module is configured to transmit data derived from the sensor (for example, a steering signal defined by the microprocessor in response to data received from the sensor). The wireless data transmission module may operate on any available wireless networking standard, for example, Bluetooth and/or ANT+. In practice, the transmission module allows coupling of the unit to either a rear end of the trainer assembly and/or a software application executing on a further device (such as a smartphone), thereby allowing the steering signal to be inputted into a simulation software application. This, in some examples, allows for the steering signal to affect control over a virtual character/object in a virtual environment. Such virtual environments are known in the context of existing trainer assemblies, although conventionally these do not have steering input capabilities.

In the present embodiment, the coaxial mounting of the top component to the base component via the central pivot assembly allows 360 degrees rotation of the top component relative to the base component. This allows for the device to be positioned on the ground in any orientation, and then be "straightened" via rotation of the top connect into a normalized position upon positioning of the wheel.

In the "smart" configuration, the sensor device is configured to measure rotation of the top component relative to the base component, thereby enabling derivation of data representative of wheel orientation relative to a defined straight-ahead orientation. This is preferably performed to infer the defined straight-ahead orientation from analysis of data collected from the sensor device, such that the straight-ahead direction is independent orientation of the base component relative to the bicycle. That is, a user can position the device on the ground with the base in in any orientation, and the straight-ahead direction will be inferred from steering input (hence there is no need to align the base of the device in a specific direction to ensure that the steering signal is accurate). The straight-ahead orientation is optionally inferred via an initial calibration process, for example, a calibration that includes processing sensor data from one or more left turn and right turn motions, thereby inferring the straight-ahead direction. In some embodiments, the initial calibration process includes processing sensor data from the sensor device via an averaging process, thereby inferring the straight-ahead direction. In some embodiments, the "straight-ahead" direction is inferred based on a position adopted in response to an instruction delivered to the user via a simulation software application.

Processing of sensor data may be performed at either or both of the unit microprocessor and within an external device (for example, within simulation software executing on a smartphone or other computing device).

It will be appreciated that the above disclosure provides a wheel block that allows for natural feel steering when used in conjunction with a stationary trainer, and that is able to be used with the base placed in any rotational orientation. Furthermore, this wheel block is configured to enable provision of a steering signal to a simulator program, optionally in combination with a signal derived from measuring bicycle tilt.

In further embodiments, additional sensors may be incorporated. One example is braking sensors (for example, sensors coupled to a brake lever or simulated brake lever), by which a user may provide input that the simulator processes to decrease simulated velocity.

It should further be appreciated that in the above description of exemplary embodiments of the disclosure, various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Thus, while there has been described what are believed to be the preferred embodiments of the disclosure, those skilled in the art will recognize that other and further modifications may be made thereto without departing from the spirit of the invention as defined by the appended claims, and it is intended to claim all such changes and modifications as falling within the scope of the invention as defined by the claims. For example, any formulas given above are merely representative of procedures that may be used. Functionality may be added or deleted from the block diagrams and operations may be interchanged among functional blocks. Steps may be added or deleted to methods described within the scope of the present disclosure.

The invention claimed is:

1. A bicycle trainer assembly, comprising:
a body that is configured to receive a bicycle having no rear wheel, wherein the trainer assembly is configured to engage with the drivetrain of the bicycle and offer controlled resistance to operation of the drivetrain of the bicycle;
a control unit embedded in the bicycle trainer assembly, the control unit being configured to wirelessly communicate with a simulation system external of the bicycle trainer assembly; and
a data collection and transmission hub provided by the control unit, wherein the data collection and transmission hub is configured to receive multiple wireless signals from multiple wireless devices, including at least one wearable physiological sensor which wirelessly pairs to the control unit in preference to the simulation system, such that the control unit is configured to provide to the simulation system a single wireless signal which embeds data provided by the wearable physiological sensor;
wherein the control unit is configured to collect performance data from one or more of:
a velocity input configured to receive a signal representative of user interaction with a bicycle drivetrain mechanism;
a steering input configured to receive a signal representative of user interaction with a bicycle handlebar turn mechanism; and
a tilting input configured to receive a signal representative of user interaction with a bicycle tilt mechanism;
wherein the control unit is configured to collect, via wireless communications, physiological data from a wearable physiological sensor; and
wherein the control unit is additionally configured to communicate, via wireless communications, data derived from the performance data and the physiological data to an external device that executes software, thereby providing a bicycle riding simulator program that includes a graphical simulator interface that is rendered on a display screen.

2. A bicycle trainer assembly according to claim 1, wherein the wearable physiological sensor includes a heart rate monitor.

3. A bicycle training system, comprising:
a structure configured to allow a conventional bicycle to be used for stationary ride simulation, the structure including;
a body that is configured to receive a bicycle having no rear wheel, wherein the trainer assembly is configured to engage with the drivetrain of the bicycle and offer controlled resistance to operation of the drivetrain of the bicycle;
a control unit configured to receive multiple signals from multiple devices, including at least one wireless signal, process those multiple signals, and provide a single wireless signal to a simulator system, thereby enabling the simulator system to receive data derived from each of the multiple devices via a single source; and
a data collection and transmission hub provided by the control unit, wherein the data collection and transmission hub is configured to receive multiple wireless signals from multiple wireless devices, including at least one wearable physiological sensor which wirelessly pairs to the control unit in preference to the simulation system, such that the control unit is configured to provide to the simulation system a single wireless signal which embeds data provided by the wearable physiological sensor;
wherein the multiple signals include any two or more of:
a velocity input configured to receive a signal representative of user interaction with a bicycle drivetrain mechanism;
a steering input configured to receive a signal representative of user interaction with a bicycle handlebar turn mechanism; and
a tilting input configured to receive a signal representative of user interaction with a bicycle tilt mechanism;
wherein the bicycle training system is additionally configured to collect physiological data from a wearable physiological sensor; and wherein the bicycle training system is additionally configured to communicate data derived from performance data and the physiological data to an external device that executes software, thereby providing a bicycle riding simulator program that includes a graphical simulator interface that is rendered on a display screen.

4. A bicycle training system according to claim 3, wherein the multiple signals include one or more wireless signals from bicycle monitoring sensors, including at least one sensor configured to measure any one or more of: velocity, steering angle, tilt, and cadence.

5. A bicycle training system according to claim 4, wherein the multiple signals include at least one signal from a device that collects physiological data from a wearable physiological sensor.

* * * * *